United States Patent [19]

Ziegler et al.

[11] Patent Number: 4,900,440

[45] Date of Patent: Feb. 13, 1990

[54] DYNAMIC PRESSURE FILTER

[75] Inventors: Heinrich Ziegler, Rutschwil; Jan R. P. de Fries, Wallisellen, both of Switzerland

[73] Assignee: Sulzer Brothers Limited, Winterthur, Switzerland

[21] Appl. No.: 206,510

[22] Filed: Jun. 14, 1988

[30] Foreign Application Priority Data

Jun. 24, 1987 [CH] Switzerland ............................ 2374/87

[51] Int. Cl.$^4$ ...................... B01D 13/00; B01D 33/02
[52] U.S. Cl. ............................ 210/321.68; 210/321.87; 210/398; 210/407; 210/456; 422/101
[58] Field of Search ............... 210/178, 179, 215, 216, 210/217, 232, 315, 297, 312.67, 321.69, 363, 365, 378, 399, 321.68, 321.87, 398, 407, 456

[56] References Cited

U.S. PATENT DOCUMENTS

| | | | |
|---|---|---|---|
| 2,730,242 | 1/1956 | Samuel | 210/179 |
| 3,797,662 | 3/1974 | Titus | 210/784 |
| 4,093,552 | 6/1978 | Guyer | 210/297 |
| 4,283,938 | 8/1981 | Epper et al. | 210/397 |
| 4,713,176 | 12/1987 | Schoendorfer et al. | 210/321.68 |
| 4,755,300 | 7/1988 | Fischel et al. | 210/321.68 |

FOREIGN PATENT DOCUMENTS

| | | |
|---|---|---|
| 0112152 | 6/1984 | European Pat. Off. |
| 2054968 | 5/1972 | Fed. Rep. of Germany |
| 2844023 | 4/1980 | Fed. Rep. of Germany |
| 2334399 | 7/1977 | France |
| WO85/02783 | 7/1985 | PCT Int'l Appl. |
| 0545642 | 2/1974 | Switzerland |

OTHER PUBLICATIONS

J. E. R. Corey et al., "A Study of Fully-Developed, Laminar, Axial Flow and Taylor Vortex Flow by Means of Shear Stress Measurements", *Journal Mechanical Engineering Science*, vol. 21, No. 1, 1979, pp. 19–23.
J. Legrand et al., "Circumferential Mixing in One--Phase and Two-Phase Taylor Vortex Flows", *Chemical Engineering Science*, vol. 41, No. 1, 1986, pp. 47–53.

*Primary Examiner*—W. Gary Jones
*Attorney, Agent, or Firm*—Kenyon & Kenyon

[57] ABSTRACT

The dynamic pressure filter is constructed with a plurality of coaxially disposed rotor sectors and stator sectors. Filter surfaces are mounted on each of the sectors to define annular filter chambers for receiving a suspension to be filtered under pressure. In addition, vortex breakers are provided at the downstream end of each filter chamber for destroying the flow structure of the suspension prior to flow into the downstream filter chamber.

19 Claims, 6 Drawing Sheets

DYNAMIC PRESSURE FILTER

This invention relates to a dynamic pressure filter.

Heretofore, dynamic pressure filters have been known which are constructed of a stator drum and a rotor drum which are rotatably mounted in a coaxial relationship to define an annular filter chamber adapted to be supplied with a suspension under pressure. In addition, both drums have been provided with filter surfaces and collecting chambers for a filtrate which filter surfaces cooperate to bound the annular filter chamber. Filters of this kind have been known, for example, from U.S. Pat. No. 3,797,662, French Pat. No. 76 37 229 or German Pat. No. 20 54 968.

Conventionally, the filter chamber has been so devised and the operating conditions have been such that the suspension flow through the filter chamber contains Taylor vorteces or eddying so that the particles accumulating on the filter surfaces are continually washed away and resupplied to the suspension to be concentrated. The problem with this is that the Taylor vorteces homogenize the suspension lengthwise of the filter chamber so that suspension viscosity always remains the same over the whole length of the filter chamber. Consequently, filter performance which corresponds to this homogenous viscosity is the same at the start of the filter chamber as at the end thereof. This is a special problem in filtration, for example, of a bio-mass containing particles and solids of 0.1 to some micrometers (microfiltration) and molecule sizes of 0.02 to 0.1 micrometers in the range of the ultrafiltration. Not just separation but also grading is therefore required.

Accordingly, it is an object of the invention to provide for different viscosities over the length of a filter chamber in a dynamic pressure filter.

It is another object of the invention to improve the filter performance of a dynamic pressure filter.

It is another object of the invention to be able to grade the filtering of a dynamic pressure filter.

It is another object of the invention to provide different viscosities along a filter chamber in accordance with increasing concentration of a suspension particularly in a range extending from microfiltration to ultrafiltration.

It is another object of the invention to provide the necessary sterility between suspension and filtrate with pressurized sealing.

Briefly, the invention provides a dynamic pressure filter which is comprised of a rotor drum, a stator drum rotatably mounted coaxially about the rotor drum, a filter surface mounted on the rotor drum to define an annular collecting chamber for a filtrate and a similar filter surface mounted on a stator drum to define an annular collecting chamber for a filtrate. In addition, the filter surfaces are concentrically spaced from each other to define an annular filter chamber for receiving a suspension to be filtered under pressure.

In accordance with the invention, at least one vortex breaker is disposed to subdivide the annular filter chamber into longitudinal sections and to destroy the flow structure of the suspension in an upstream longitudinal section in order to allow a new flow structure to form in the suspension in a downstream longitudinal section.

The vortexes are so destroyed or laminarised at the vortex breaker that the suspension does not become homogenized along the filter chamber. Thus, in each longitudinal section, the suspension has a viscosity corresponding to the advancing concentration of the suspension. Total filtration performance is therefore increased. Also, filtrates of different quality, for example, which contain solids graded by size, can be removed from the discrete longitudinal sections.

These and other objects and advantages of the invention will become more apparent from the following detailed description taken in conjunction with the accompanying drawings wherein:

FIG. 1 diagrammatically illustrates a cross-sectional view through a dynamic pressure filter constructed in accordance with the invention;

Figure 1:
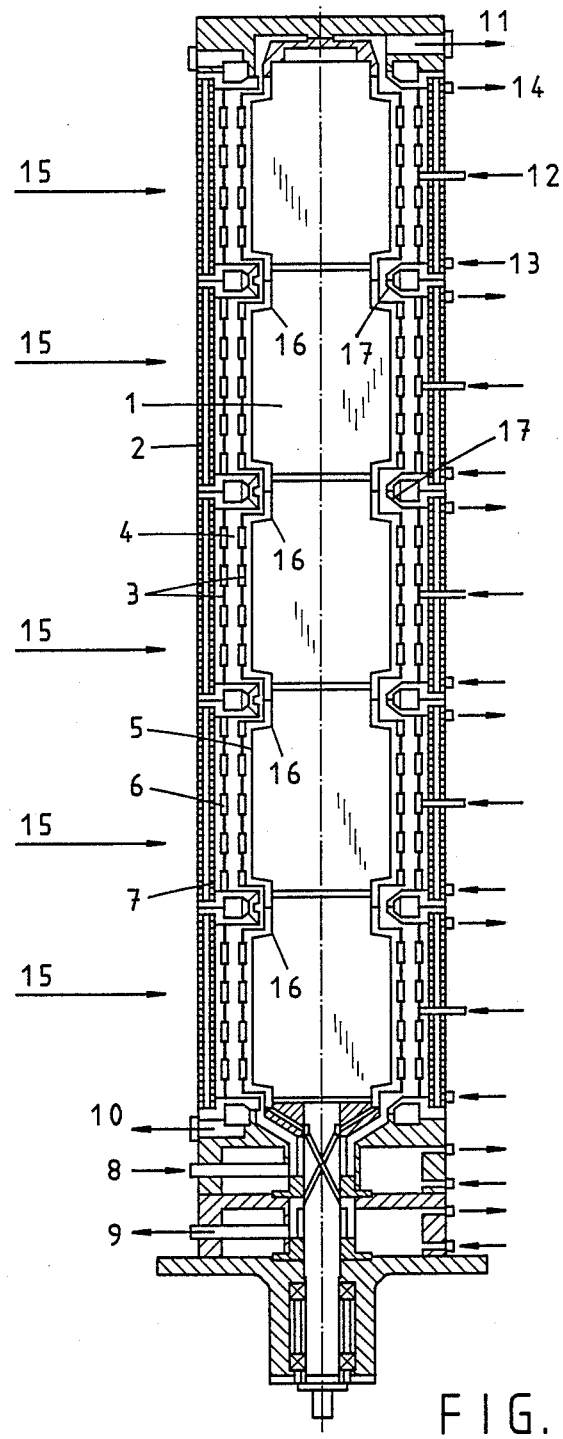

Referring to FIG. 1, the dynamic pressure filter is comprised of a rotor drum 1 and a stator drum 2 which are mounted in coaxial spaced relation along a vertical axis. Each drum carries a filter surface 3 which cooperate to bound an annular filter chamber 4 which is adapted to be supplied with a suspension through a connection 8. In addition, a connection 11 is provided at the top of the filter for removal of concentrate from the annular chamber 4.

The filter surface mounted on the rotor drum 1 serves to define an annular collecting chamber 5 for a filtrate while the filter surface 3 mounted on the stator drum 2 serves to define an annular collecting chamber 6 for collecting a filtrate.

The pressure filter also has a cooling jacket 7 which extends concentrically about the filter chamber 6 of the stator drum 2 and which is connected by way of connections 13, 14 to a supply of coolant.

A line 9 is provided at the lower end of the filter for removing filtrate from the rotor collecting chamber 5 while a second line 10 is provided for removing filtrate from the stator collecting chamber 6. Suitable lines or feed connections 12 also extend into the filter chamber 4 for supplying, if necessary, washing liquid or some other liquid.

The filter chamber 4 is subdivided into longitudinal sections 15 between each of which there is a vortex breaker 16 in which the flow structure evolved in the upstream section 15 considered in the direction of suspension flow is broken up in the breaker 16 so that a new flow structure forms in the next downstream section 15. This counteracts the tendency to eddy, mainly for Taylor vortices tending to homogenize the suspension—i.e., the viscosity thereof—axially. The viscosity of the suspension thus differs from section to section and corresponds to the advance of concentration of the suspension along the filter chamber 4. That is, at the start of the chamber 4, viscosity is low, so that filtration is relatively high. Also, viscosity increases in steps to the end of the chamber 4 so that filtration performance decreases from section to section. The alligation of the discrete performances gives a higher overall performance than would be the case with a continuous filter chamber.

The vortex breaker 16 is embodied by a duct guide of the same profile as the filter chamber 4, the preceding Taylor vortices being broken up in the breaker 16. The break-up is produced by variations of the flow path section in direction of the rotor axis and/or by flow deflections in radial directions to and away from the rotation axis of the rotor 1.

Figure 3:
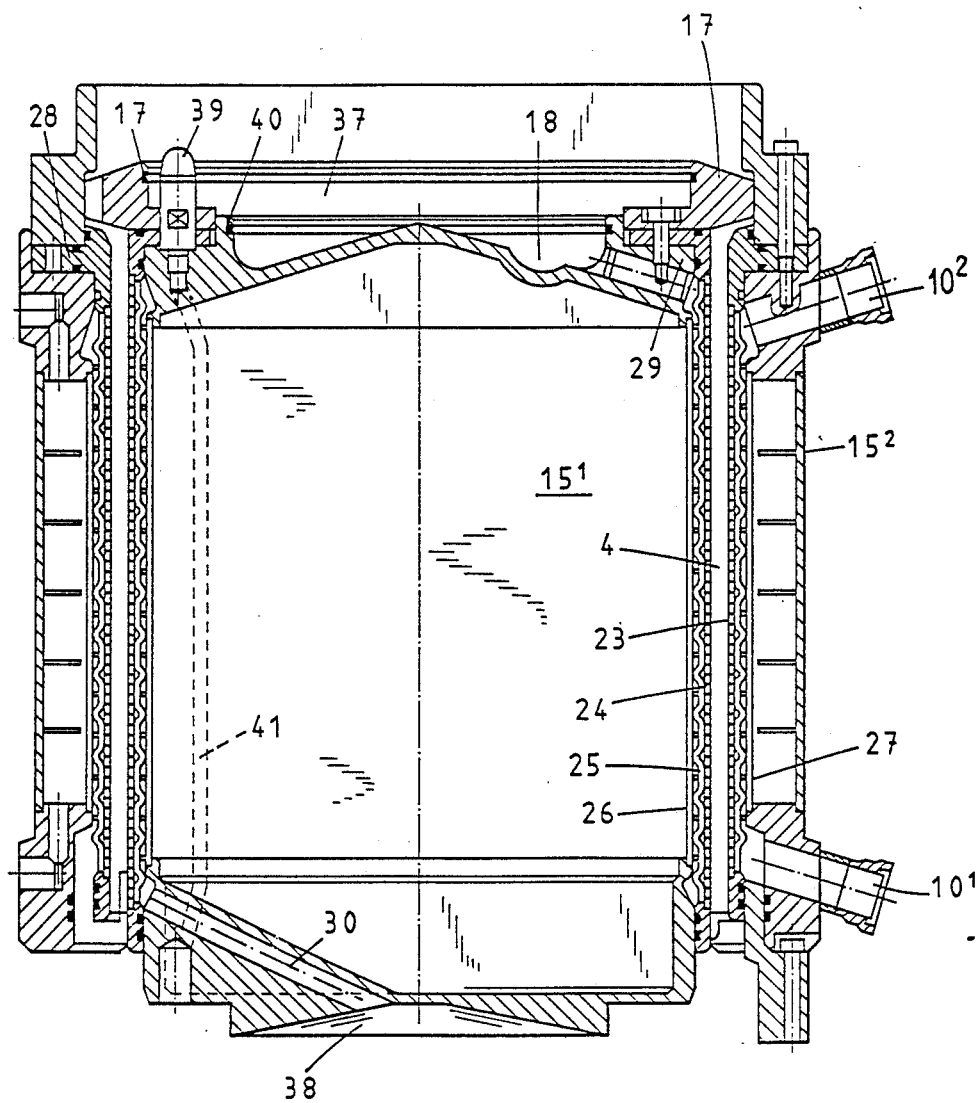
FIG. 3 illustrates an enlarged view of a longitudinal section of the dynamic pressure filter in accordance with the invention.

Referring to FIG. 3, each discrete section 15 is formed of a rotor sector $15^1$ and a stator sector $15^2$ of corresponding length. In addition, an element 17 as vortex breaker defines a restriction in axial direction and deflections in radial direction of the flow path at the end of each sector 15 of the filter chamber 4 and is disposed between the individual sectors $15^1$ and $15^2$ forming the longitudinal sections 15.

Figure 6:
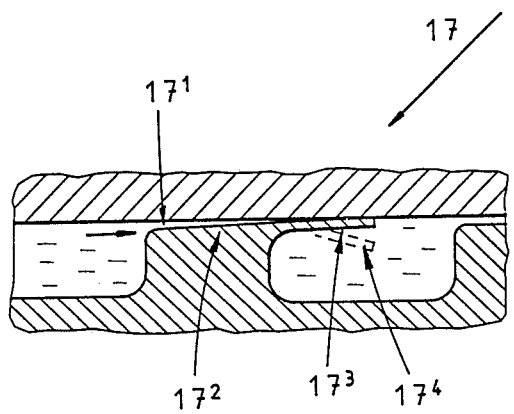
FIG. 6 diagrammatically illustrates a hydrodynamic bearing employed within the pressure filter in accordance with the invention.

Referring to FIG. 6, the vortex breaker 16 is embodied by a conventional hydrodynamic bearing, known per se, for example, in turbomachinery, which bearing guides the rotor drum 1 radially in the stator drum 2. The bearing is a Mitchell bearing which is so devised for the sensitive biomass to be processed that the segments $17^2$ which form a hydrodynamic wedge $17^1$ have resilient vane-like parts $17^3$ which extend in the direction of rotation and which yield in response to increasing pressure in the wedge $17^1$ so that excess pressure damaging the biomass is automatically reduced. This position of the parts $17^3$ has the reference $17^4$.

Advantageously, the bearing surfaces which may rub on one another have a protective layer, for example, of polytetrafluoraethylene. Since the biomass to be treated is also sensitive to heat, the heat arising from sheer stressing on the filter surface and, therefore, overheating and destruction of the suspension, must be cooled down. Cooling of the suspension and filtrate is provided by way of the outer cooling jacket 7.

Figure 2:
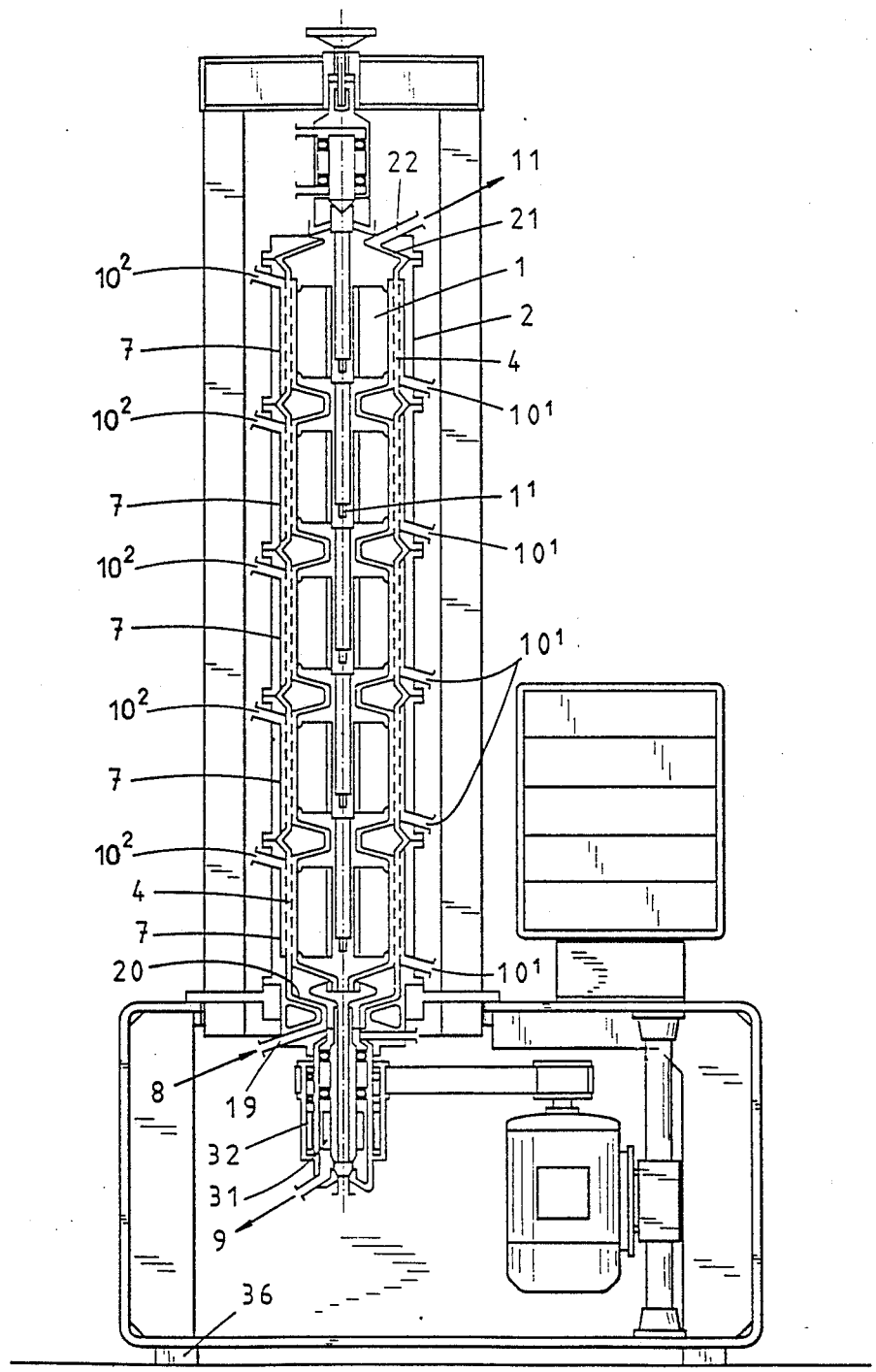
FIG. 2 illustrates a diagrammatic view of a pressure filter arrangement employing a filter in accordance with the invention.

As can be gathered from FIG. 2, the filtrate collector chambers 6 of the stator and drum 2 have their own filtrate removal connections $10^1$ and $10^2$. Consequently, the filtrate can be removed separately from each section 15 as desired above or below. The rotor collector chamber 5 can be subdivided and, for example, some of the filtrate can be removed downwardly and some upwardly. This separation of filtrate removal from the rotor and stator collector chambers 5, 6 respectively has, for example, the advantage that the discrete discharges can be monitored for turbidity so that the discrete discharges are mixed together only after the discrete filtrate flow has been checked. Consequently damage to a filter surface, for example, of the diaphragm, can be located. This also enables the discrete filtration fraction to be removed separately when the pressure filter is used for grading. It would be advantageous and feasible to provide automatic filling machines into which the filtrate could be filled in small quantities in a completely sterile manner, for example, with the exclusion of air.

Referring to FIG. 3, in order to locate the cause of turbidity, a filtrate retention zone 18 is provided in each discrete longitudinal section. This zone 18 forms an enclosure in which a little filtrate remains after demounting of the discrete longitudinal sections of the filter. This filtrate can be tested as a sample and so the fault can be located.

Figure 4A:
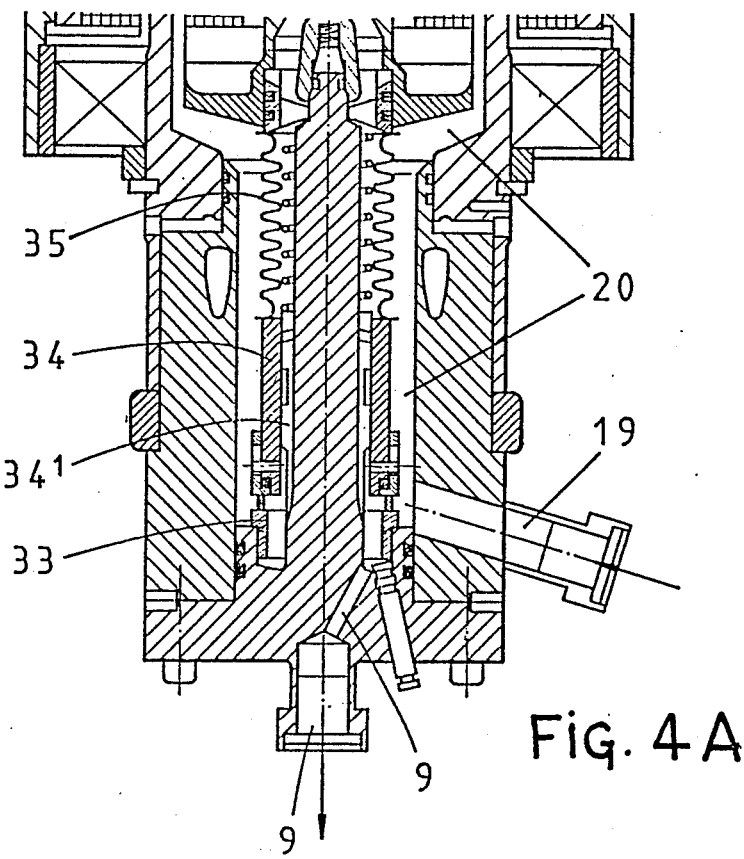
FIG. 4a illustrates an enlarged view of the bottom of FIG. 4.
Figure 4:
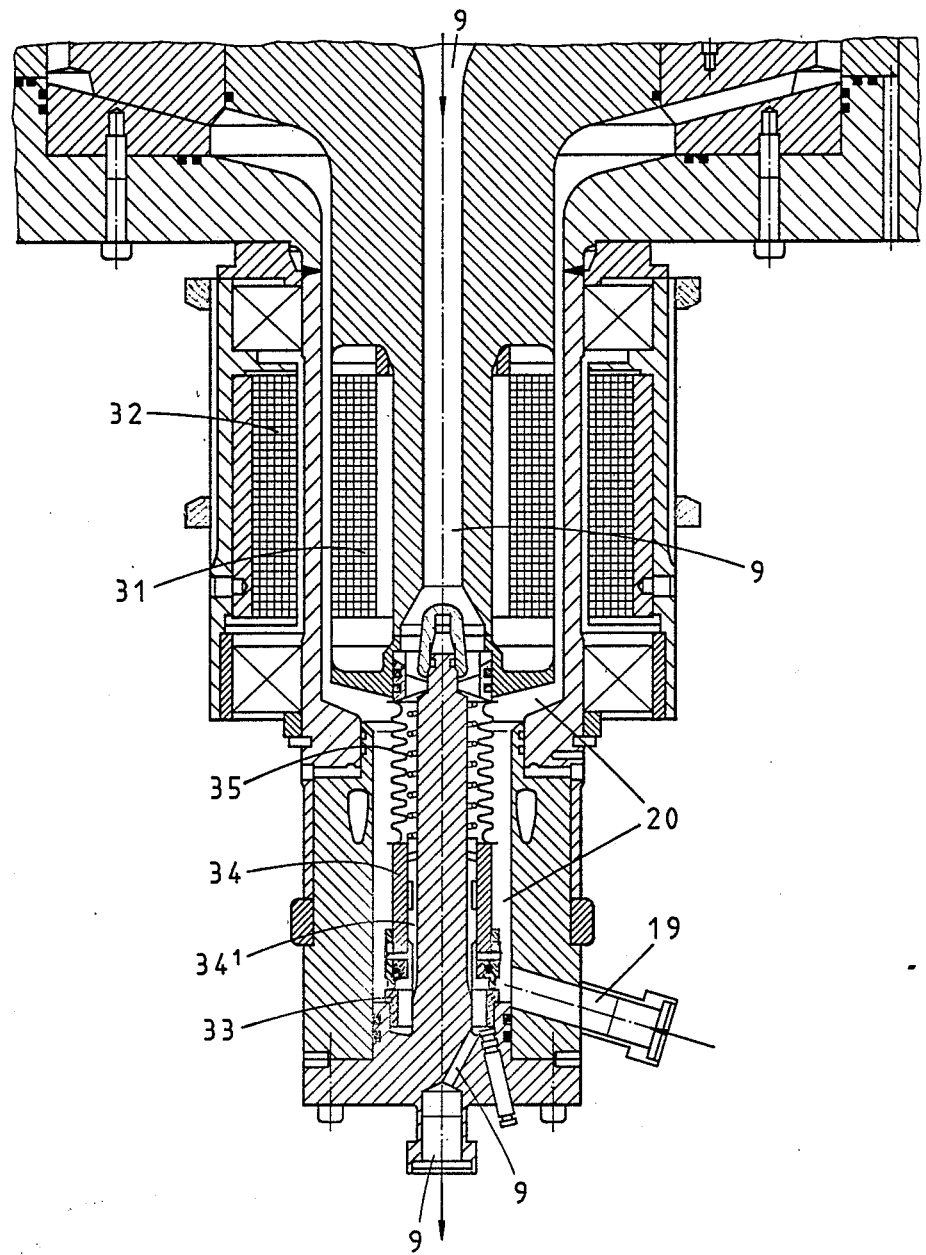
FIG. 4 illustrates a bottom part of a pressure filter constructed in accordance with the invention.

Referring to FIGS. 2 and 4, a feed duct 19 is provided at the bottom of the filter for supplying the filter with the suspension 8. This duct 19 extends radially inwards and is inclined upwardly to terminate in an annular duct 20 in the rotor drum 1. The duct 20, in turn, extends radially outwards and inclinedly upwards, to the filter chamber 4. This means that, in operation, a delicate suspension is accelerated gently to the peripheral speed of the rotor drum 1. The energy used here is recovered at the end of the filter chamber 4 and the suspension is braked gently due to the provision in the rotor drum 1 of an annular concentrate-receiving duct 21 which extends upwardly and radially inwards into a concentrate removal duct 22, the latter extending outwardly and inclinedly upwards.

The discrete rotor sectors $15^1$ of the sections 15 are held together by the axial pressure arising from the pressure difference between the filter chamber 4 and the filtrate collector chambers 5, 6. The joining together can be achieved by means of magnetic and/or mechanical connecting elements. This is shown in FIG. 2 in the form of a screwing-together of the rotor drum shaft via a screw connection 1'.

Referring to the FIG. 3, each filter surface in a discrete longitudinal section 15 has a filter membrane 23 sized for microfiltration to ultrafiltration and facing the filter chamber 4. Each membrane 23 is supported in the other direction on layers of backing material 24 which engage with a coarse-mesh metal fabric 25 which bears on a wall 26 of the rotor sector $15^1$ or on a wall 27 of the stator sector $15^2$, respectively. The metal fabric 25 leaves the filtrate collecting chamber 5, 6 free between the layers of the backing fabric 24 and the wall, 26, 27.

Since the filter membranes 23 are delicate, special arrangements must be made to demount and fit the filter surface 3. To this end, each filter surface 3 comprising a membrane 23, layer 24 and coarse-mesh fabric 25 is secured to a respective flange ring 28, 29 enabling the surface 3 associated with the stator sector and with the rotor sector to be withdrawn or inserted. These steps must be carried out at an inspection or repair particularly for fine membranes.

The pressure filter can be sterilized by steam. To facilitate the rise of the steam through the filter, all the duct and ring structures have a slope of more than 15°. (cf e.g., the shape of the duct 30 for removing filtrate from the rotor collector chamber 5 in FIG. 3). To facilitate the access of steam to spaces of poor accessibility, places where the steam can build up are provided, for example, before blind bores, and facilitate the entry of the steam. To facilitate sealing of the sterile chambers of the filter, the drive is of a magnetic type using a group of magnetic poles 31 on the rotor drum 1 which are drivable by means of a magnetic field 32 which rotates externally around the stator drum 2.

As can be gathered more particularly from FIGS. 4 and 4a two coaxial annular chambers nested one in another are disposed centrally to introduce the suspension through the feed duct 19 and to remove the filtrate from the rotor drum through the connection 9. The annular chamber for the filtrate, such chamber being disposed coaxially of the rotor drum axis, is sealed by means of a conventional rotating mechanical seal or packing 33, a sleeve 34 and bellows 35 relative to the annular chamber for the suspension 8. A hydrodynamic radial bearing 34 of the seal 33 is disposed in the filtrate flow. As shown, the complete arrangement, the stator parts and a pulley of the magnetic drive 32 are demountable and therefore rapidly accessible for repairs. This is essential, particularly in the case of a sensitive biomass.

Figure 5:
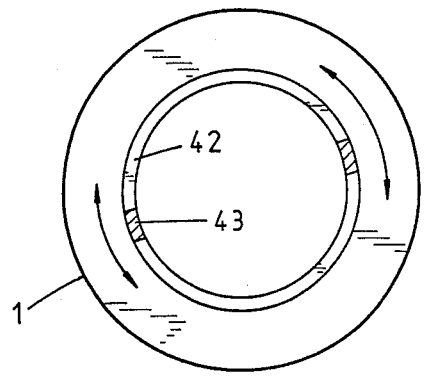
FIG. 5 illustrates a diagrammatic view of a means for dynamic balancing of the rotor of the pressure filter.

Referring to FIG. 2, the vertically mounted pressure filter is mounted on rubber-to-metal vibration dampers 36. Advantageously in this case, the rotor is balanced dynamically. To this end, an adjustable dynamic balancing facility is provided at the top of the rotor drum 1 and is formed as indicated in FIG. 5 with a circular groove 42 which is coaxial of the rotor drum and in which balance weights 43 can be placed for adjustment.

As is shown in FIG. 3, the rotor sectors $15^1$ have annular zones 37, 38 at the top and at the bottom for interfitting in like zones of the adjacent section. In addition, a driving and support element, such as a screw-threaded pin 39, is disposed in one of the zones 37, 38 of one section $15^1$ to fit in a recess of the other of said zones 37, 38 of the next section 15. Each room surrounding an element 39 is separated by seals, for example, a ring seal 40 from the adjacent filter zones and from the adjacent filtrate removal zones; adjacent sectors of the filtrate removal zones communicate by a duct 30. The separate media-free rooms surrounding the elements 39 of the discrete sectors intercommunicate with one another by way of a continuous line 41 for sterilization and exhausting.

Figure 2A:
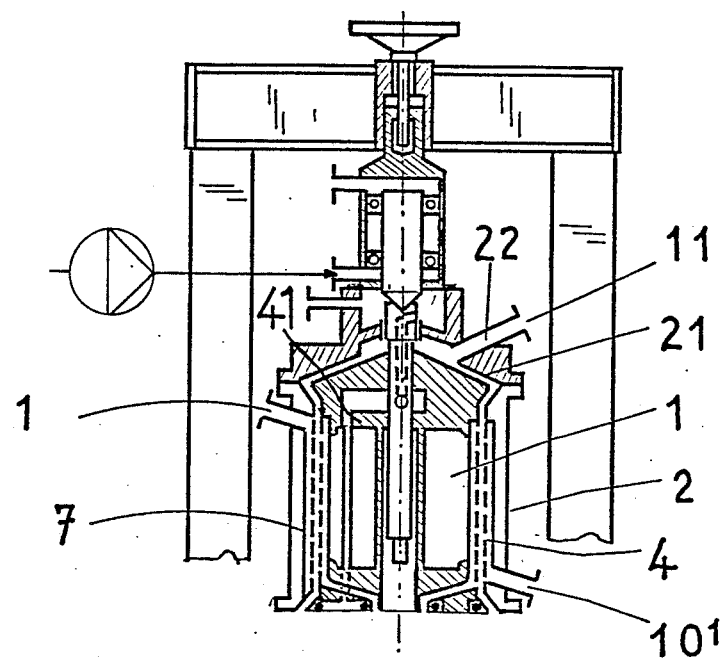
FIG. 2a illustrates an enlarged view of the top of FIG. 2.

By a connection—preferably at the top of the rotor 1 (see FIG. 2a)—of a pressure medium duct 44—for example for sterilized air—the pressure in the line 41 and in the rooms surrounding the element 39 respectively—can be kept above the highest pressure of the fluids in the filtering process. The ring seals (f.e. 40) are thus pressed toward the fluids, no fluid can enter into the grooves of the seals.

What is claimed is:

1. A dynamic pressure filter comprising
   a cylindrical rotor drum;
   a cylindrical stator drum mounted coaxially about said rotor drum;
   a first filter surface mounted on said rotor drum to define an annular collecting chamber for a filtrate;
   a second filter surface mounted on said stator drum to define an annular collecting chamber for a filtrate and concentrically spaced from said first filter surface to define an annular filter chamber for receiving a suspension to be filtered under pressure; and
   at least one vortex breaker subdividing said annular chamber into longitudinal sections and disposed for destroying the flow structure of the suspension in an upstream longitudinal section to allow a new flow structure to form in the suspension in a downstream longitudinal section.

2. A dynamic pressure filter as set forth in claim 1 wherein said vortex breaker is an annular restriction in said annular chamber whereby Taylor vortices in said upstream longitudinal section are destroyed in said restriction for subsequent re-forming in the downstream longitudinal section.

3. A dynamic pressure filter as set forth in claim 1 wherein said drums are longitudinally subdivided into discrete sections and wherein each section has individual feed connections for introducing suspension washing liquid or some other liquids into said annular chamber thereof.

4. A dynamic pressure filter as set forth in claim 3 wherein said section has removal connections for removing filtrate from said filter chambers thereof.

5. A dynamic pressure filter as set forth in claim 1 which further comprises a cooling jacket on said stator drum concentrically about said filter chamber therein.

6. A dynamic pressure filter as set forth in claim 1 wherein each filter surface includes a filter membrane sized for one of microfiltration and ultrafiltration facing said filter chamber, at least one layer of backing material and a coarse mesh metal fabric facing a respective annular collecting chamber.

7. A dynamic pressure filter as set forth in claim 1 further comprising an annular feed path for supplying suspension to said filter chamber, an annular discharge path within said feed path for discharging concentrate, a rotating mechanical seal between said chambers and a hydrodynamic bearing on said seal in the filtrate flow for guiding said seal.

8. A dynamic pressure filter as set forth in claim 1 further comprising vibration dampers for mounting the pressure filter on a base.

9. A dynamic pressure filter as set forth in claim 1 which further comprises an adjustable balancing means on said rotor.

10. A dynamic pressure filter comprising
    a rotor drum having a plurality of coaxially disposed rotor sectors;
    a stator drum mounted coaxially about said rotor drum and having a plurality of coaxially disposed stator sectors;
    a first filter surface mounted on each said rotor sector to define an annular collecting chamber for a filtrate;
    a second filter surface mounted on each said stator sector to define an annular collecting chamber for a filtrate and concentrically spaced from said first filter surface to define an annular filter chamber for receiving a suspension to be filtered under pressure; and
    a vortex breaker disposed between each adjacent rotor sector and stator sector for destroying the flow structure of the suspension in an upstream filter chamber to allow a new flow structure to form in the suspension in a downstream filter chamber.

11. A dynamic pressure filter as set forth in claim 10 which further comprises a means securing said rotor sectors together.

12. A dynamic pressure filter as set forth in claim 10 which further comprises a first ring secured to a respective rotor sector and a second ring secured to a respective stator sector within said first ring for mounting of said sectors.

13. A dynamic pressure filter comprising
    a rotor drum;
    a stator drum mounted coaxially about said rotor drum;
    a first filter surface mounted on said rotor drum to define an annular collecting chamber for a filtrate;
    a second filter surface mounted on said stator drum to define an annular collecting chamber for a filtrate and concentrically spaced from said first filter surface to define an annular filter chamber for receiving a suspension to be filtered under pressure; and
    at least one hydrodynamic bearing subdividing said annular chamber into longitudinal sections and disposed in the flow of the suspension for destroying the flow structure of the suspension in an upstream longitudinal section to allow a new flow structure to form in the suspension in a downstream longitudinal section.

14. A dynamic pressure filter as set forth in claim 13 wherein said hydrodynamic bearing is a radial Mitchell bearing disposed for guiding said rotor drum radially relative to said stator drum.

15. A dynamic pressure filter as set forth in claim 14 wherein said bearing has vane-like parts on said rotor drum and facing said stator drum to form a hydrodynamic wedge of the flowing suspension, each vane-like part being resiliently yieldable under the pressure of a wedge.

16. A dynamic pressure filter comprising a rotor drum;

a stator drum mounted coaxially about said rotor drum;

a first filter surface mounted on said rotor drum to define an annular collecting chamber for a filtrate;

a second filter surface mounted on said stator drum to define an annular collecting chamber for a filtrate and concentrically spaced from said first filter surface to define an annular filter chamber for receiving a suspension to be filtered under pressure;

at least one vortex breaker subdividing said annular chamber into longitudinal sections and disposed for destroying the flow structure of the suspension in an upstream longitudinal section to allow a new flow structure to form in the suspension in a downstream longitudinal section;

a first duct extending radially inwardly and upwardly at an angle for a flow of suspension;

a first annular duct in said rotor communicating with said first duct and extending radially outwardly and upwardly at an angle to said filter chamber;

a second annular duct in said rotor communicating with a downstream end of said filter chamber to receive concentrate therefrom and extending radially inwardly and upwardly from said filter chamber; and a second duct extending from said second annular duct to remove concentrate therefrom.

17. A dynamic pressure filter comprising a rotor drum having a plurality of coaxially disposed rotor sectors;

a stator drum mounted coaxially about said rotor drum and having a plurality of coaxially disposed stator sectors;

a first filter surface mounted on said rotor drum to define an annular collecting chamber for a filtrate;

a second filter surface mounted on said stator drum to define an annular collecting chamber for a filtrate and concentrically spaced from said first filter surface to define an annular filter chamber for receiving a suspension to be filtered under pressure;

at least one vortex breaker subdividing said annular chamber into longitudinal sections and disposed for destroying the flow structure of the suspension in an upstream longitudinal section to allow a new flow structure to form in the suspension in a downstream longitudinal section;

driving and support elements interconnecting said rotor sectors; and seals sealing annular rooms surrounding said elements from said annular filter chambers and from said filtrate removal chambers in said rotor drum.

18. A dynamic pressure filter as set forth in claim 17 wherein said rotor sectors include interfitting annular zones and a continuous line connecting said annular zones of a respective rotor sector to each other for flow of a sterilization medium therebetween.

19. A dynamic pressure filter as set forth in claim 18 wherein said continuous line is connected to means defining a pressure medium source.

* * * * *

UNITED STATES PATENT AND TRADEMARK OFFICE
CERTIFICATE OF CORRECTION

PATENT NO. : 4,900,440

DATED : Feb. 13, 1990

INVENTOR(S) : HEINRICH ZIEGLER, et al

It is certified that error appears in the above-identified patent and that said Letters Patent is hereby corrected as shown below:

```
Column 1, line 19 "vorteces" should be -vortices-
Column 1, line 23 "teces" should be -tices-
Column 1, line 64 "vortexes" shoudl be -vortices-
Column 3, line 35 "polytetrafluoraethylene" should be
   -polytetrafluoroethylene-
```

Signed and Sealed this

Twenty-third Day of July, 1991

Attest:

HARRY F. MANBECK, JR.

Attesting Officer

Commissioner of Patents and Trademarks